CHARLES H. WILLCOX.

Improvement in Sewing Machine Needles.

No. 4,663. Reissued Dec. 5, 1871.

*Witnesses.*

W. Bailey

C. B. Nottingham.

*Inventor.*

Charles H. Willcox ass.r
by mesne assignement to the
Willcox & Gibbs Sewing machine Co
by
A. Pollok
his atty

THE NORRIS PETERS CO., PHOTO-LITHO., WASHINGTON, D. C.

UNITED STATES PATENT OFFICE.

CHARLES H. WILLCOX, OF NEW YORK, N. Y., ASSIGNOR, BY MESNE ASSIGNMENTS, TO THE WILLCOX & GIBBS SEWING-MACHINE COMPANY.

IMPROVEMENT IN SEWING-MACHINE NEEDLES.

Specification forming part of Letters Patent No. 753, dated March 19, 1861; reissue No. 4,663, dated December 5, 1871.

*To all whom it may concern:*

Be it known that I, CHARLES H. WILLCOX, of New York, in the county and State of New York, have invented a certain new and Improved Sewing-Machine Needle; and I do hereby declare that the following, taken in connection with the accompanying drawing which forms part of this specification, is such a full and clear description as to enable others skilled in the manufacture of sewing-machine needles and the working of them to make and use this my improved needle.

Figure 1:
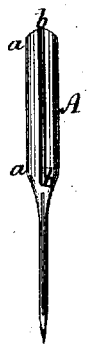
Figure 2:
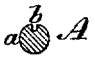

In the accompanying drawing, Figure 1 represents a longitudinal view of a sewing-machine needle constructed according to my improvement, and Fig. 2 a transverse view or section of the same.

This my invention relates to a peculiarly-constructed needle as a new article of manufacture, and applicable to sewing-machines of various kinds, whether using a single or double thread.

In Letters Patent issued July 31, 1860, I have described a method of securing the proper adjustment of the needle in the socket of its (sewing-machine) stock or holder by means of an inner spline or locking-guide to the socket, in combination with a needle grooved or slotted longitudinally at its shank. Such combination effects all the advantages that were designed to be attained by it; but as such a needle may, of itself, be manufactured and sold separate from the holder or machine it is intended to fit, I now desire to seek protection for it, apart from the holder, by Letters Patent.

In the manufacture of such needles much particularity is requisite, and considerable expense has been incurred in the construction of suitable machinery for making them rapidly and perfectly. For instance, it is all-important that the longitudinal slot or groove in the needle should be truly formed, both in relation to its size and position on the shank of the needle and in relation to its line position with the eye thereof. An inferior production of such a needle may be effected by less perfect machinery, and such slotted needles may, without regard to their fit in any particular machine or certain holders of a certain kind of machine, be sold indiscriminately to the public, who, finding them to work badly, readily condemn such description of needle, or attribute fault to the machine they are used in or with, thus doing injustice alike to such character of needles and to the machines with which they are identified in the market. It is due to the public, then, that they should be protected from buying needles of the character referred to as applicable to certain machines or needle-holders for which they were never made, or imperfectly made; hence my desire to secure by Letters Patent, as a new article of manufacture, the peculiarly-constructed needle apart from the holder it fits.

The following preliminary remarks and subsequent description will, in connection with the accompanying drawing, serve to explain my invention.

In sewing-machines the needle, which is an eye-pointed one, is required to bring the thread through the cloth in such a manner as, in one of its strokes, to form or leave a loop that has to be passed through it, by a shuttle or other device, a secondary thread, or which is held and twisted or turned or otherwise acted upon by a hook or looper, either to effect its interlacing with a secondary thread or with a subsequent loop of the same thread in or by the further and repeated action of the needle. The needle and needle-eye then must occupy, when moving or when reaching a certain point, a certain relationship to the path of the shuttle or hook or looper to secure the interlacing of the loops of the needle-thread either with each other or with a secondary thread, or with both, and as the course of the shuttle or hook or looper is a defined one, and in a given direction, so must be, and is, the course of the needle; or, rather, so must be the position of the needle or needle-eye when and where it forms or leaves the loop to produce the required stitch. Were it not necessary to remove the needle at different periods, then it would be easy to meet the requirement here spoken of by first setting the needle right; but the needle, in time, wears dull or gets bent or broken, and is often required to be replaced for either of these causes, or when a finer or stouter needle is wanted for work of a differing character, or to work thread of different kinds, or in some cases to facilitate passing of the thread through the eye of the needle. Also, the needle, under certain construction of holders, may turn or shift from its prescribed position so as to change the position of the eye relatively to the line of feed or path of the shuttle or looper; consequently the adjustment of the needle is an important feature in sewing-machines;

and as it commonly falls to the lot of persons inexperienced in machines, such as women and children employed in working these machines, to properly fit into the stock every freshly-inserted or replaced needle, or to adjust it when in the stock, such is often attendant with difficulty to many, and with trouble and annoyance and great loss of time to others. It has, therefore, been a desideratum to meet this difficulty by an automatic action or such arrangement of the parts as secure without failure, and without the exercise of much or any skill, the proper position and adjustment of the needle; and this my invention is calculated to accomplish in a most perfect manner, as well as to secure a steady retention of the needle in its stock, alike free from twist or shake. And here I would observe, preparatory to describing my invention, that I altogether discard, for the purpose or purposes named, needles with angular or polygonal-shaped shanks arranged to fit holders having similar-shaped sockets, as such are, if not impossible, at least difficult to construct, and they present angles or corners liable, by wear, to affect the adjustment, and are objectionable as regards freedom from shake or play. Thus, to form the needle with a square shank and the socket of the holder with a square hole or recess to receive the shank, present difficulties of construction and almost unavoidable imperfections, both as regard the needle and its holder, which a round or drilled hole in the socket and a round needle-shank altogether avoid.

In the accompanying drawing, A represents a needle of such last-named advantageous form, its shank *a* being round, preferably of enlarged diameter to the piercing portion of the needle, and serving to fit a round hole in the socket of the holder, which may accordingly be drilled, and thereby all difficulty attendant upon the construction of the holder to establish a true fit with the round-shank needle be altogether avoided. But such construction of the needle will not of itself accomplish the desideratum required, whatever clamping character may be given to the stock or holder. Consequently, to facilitate and make certain the proper adjustment or set of the needle in its socket, with the eye of the needle in the required position before referred to, and to make any other position or adjustment of the needle an impossibility, I form the round needle-shank *a* with a longitudinal slot, depression, or groove, *b*, in it, which, fitting a spline or feather standing, say, as a radial projection in the socket of the holder, readily admits of the needle being guided or adjusted to its proper set without the exercise of much or any skill, and whereby the needle is prevented from turning in its holder, the socket of which may be made slightly taper and be split, with a screw-cap fitting over it to hold the needle from drawing or dropping out; or the holder may be otherwise suitably constructed to form a clamp to the needle.

What I claim, then, as my invention, and desire to secure by Letters Patent, is—

An eye-pointed sewing-machine needle, the same forming a new article of manufacture, having combined with its round shank a slot or groove, substantially as and for the purpose or purposes herein set forth.

In testimony whereof I have signed my name to this specification before two subscribing witnesses.

CHAS. H. WILLCOX.

Witnesses:
CYRUS CARLETON,
R. S. HAYWARD.

(134)